US011506244B2

(12) United States Patent
Yeom et al.

(10) Patent No.: US 11,506,244 B2
(45) Date of Patent: Nov. 22, 2022

(54) REDUCER OF ELECTRIC POWER STEERING APPARATUS

(71) Applicant: MANDO CORPORATION, Gyeonggi-do (KR)

(72) Inventors: SeulKi Yeom, Seoul (KR); TaeHo Kim, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 1093 days.

(21) Appl. No.: 16/141,979

(22) Filed: Sep. 26, 2018

(65) Prior Publication Data
US 2019/0101164 A1    Apr. 4, 2019

(30) Foreign Application Priority Data

Sep. 29, 2017 (KR) .......... 10-2017-0127054
Sep. 29, 2017 (KR) .......... 10-2017-0128203

(51) Int. Cl.
| | | |
|---|---|---|
| *F16H 1/16* | (2006.01) | |
| *F16D 3/12* | (2006.01) | |
| *B62D 5/04* | (2006.01) | |
| *F16H 57/00* | (2012.01) | |
| *F16D 3/68* | (2006.01) | |

(52) U.S. Cl.
CPC ............ *F16D 3/12* (2013.01); *B62D 5/0409* (2013.01); *F16D 3/68* (2013.01); *F16H 57/0006* (2013.01); *F16H 1/16* (2013.01)

(58) Field of Classification Search
CPC .......... F16D 3/12; F16D 3/68; B62D 5/0409; B62D 5/0421; F16H 57/0006; F16H 1/16
See application file for complete search history.

(56) References Cited

U.S. PATENT DOCUMENTS

| | | | | |
|---|---|---|---|---|
| 6,564,666 | B1* | 5/2003 | Marcel ............... | F16H 1/16 74/425 |
| 2012/0322566 | A1* | 12/2012 | Kim ................ | F16D 3/76 464/88 |
| 2014/0291063 | A1* | 10/2014 | Kim ................ | B62D 5/0409 180/444 |
| 2016/0194024 | A1* | 7/2016 | Kikuchi ............ | F16H 1/16 180/444 |

(Continued)

FOREIGN PATENT DOCUMENTS

| | | |
|---|---|---|
| CN | 101586631 | 11/2009 |
| CN | 102837726 | 12/2012 |
| CN | 104011414 | 8/2014 |

(Continued)

OTHER PUBLICATIONS

Office Action dated Dec. 1, 2020 for Chinese Patent Application No. 201811150492.7 and its English machine translation by Google Translate.

(Continued)

*Primary Examiner* — David J Hlavka
(74) *Attorney, Agent, or Firm* — Ladas & Parry, LLP (57) ABSTRACT

Provided is a reducer of an electric power steering apparatus. The reducer has a significantly reduced volume, a decreased number of components, and a shortened production process and can prevent vibration and noise generated during power transfer while removing noise caused by a clearance between a shaft and a power transfer member.

16 Claims, 10 Drawing Sheets

(56) References Cited

U.S. PATENT DOCUMENTS

2016/0332659 A1\* 11/2016 Hong .................... B62D 5/0409
2017/0175821 A1\* 6/2017 Segawa ..................... F16D 3/74

FOREIGN PATENT DOCUMENTS

| CN | 104097683 | 10/2014 |
| CN | 106090051 | 11/2016 |
| CN | 106143597 | 11/2016 |
| CN | 107401583 | 11/2017 |
| JP | 2009-51441 | 3/2009 |
| JP | 2013-107640 | 6/2013 |
| JP | 2016-20718 | 2/2016 |
| KR | 10-1382034 | 4/2014 |
| KR | 10-2017-0041983 | 4/2017 |
| WO | 2016/175267 | 11/2016 |

OTHER PUBLICATIONS

Office Action dated Nov. 3, 2019 for Korean Patent Application No. 10-2017-0127054 and its English translation by Global Dossier.
Office Action dated Nov. 26, 2021 for Korean Patent Application No. 10-2017-0128203 and its English machine translation from Global Dossier.
Notice of Allowance dated Sep. 8, 2021 for Chinese Patent Application No. 201811150492.7 and its English translation from Global Dossier.
Office Action dated Jun. 15, 2021 for Chinese Patent Application No. 201811150492.7 and its English machine translation by Google Translate/Global Dossier.
Office Action dated Nov. 20, 2018 for Korean Patent Application No. 10-2017-0127054 and its English machine translation by Google Translate.
Notice of Allowance dated Apr. 12, 2022 for Korean Patent Application No. 10-2017-0128203 and its English translation from Global Dossier.

\* cited by examiner

REDUCER OF ELECTRIC POWER STEERING APPARATUS

CROSS REFERENCE TO RELATED APPLICATION

This application claims priority from Korean Patent Application Nos. 10-2017-0128203 & 10-2017-0127054, filed on Sep. 29, 2017 which are hereby incorporated by reference for all purposes as if fully set forth herein.

BACKGROUND OF THE INVENTION

1. Field of the Invention

These embodiments relate to a reducer of an electric power steering apparatus, and more particularly, to a reducer of an electric power steering apparatus having a significantly reduced volume, a decreased number of components, and a shortened production process and capable of preventing vibration and noise generated during power transfer by removing noise due to a clearance between a shaft and a power transfer member.

2. Description of the Prior Art

A steering apparatus, which allows a driver to freely turn a steering wheel to change a vehicular traveling direction, is an apparatus for assisting a driver in driving a vehicle along a desired direction by arbitrarily changing the turning center of the front wheel of the vehicle.

Such a steering apparatus uses a power steering apparatus as an auxiliary power mechanism to assist a driver when he or she exerts force on a steering wheel.

A hydraulic power steering apparatus has a structure of detecting rotation of a steering wheel, receiving torque from an engine, activating a hydraulic pump, and transferring hydraulic pressure to an actuator such as a cylinder installed in a rack bar or a steering shaft, thereby assisting a driver's steering effort.

An electric power steering apparatus has a structure of detecting rotation of a steering wheel and activating a motor installed in a rack or a steering shaft to assist rotational movement, thereby promoting smooth operation of the steering apparatus.

However, a power transfer member of a reducer of the conventional electric power steering apparatus has a structure in which an inner rotor and an outer rotor are press-fitted and brought in direct contact with each other. Thus, great shock is reversely input during abrasion or off-road running, thus causing axial deviation and also causing clearance and noise due to abrasion.

SUMMARY OF THE INVENTION

Exemplary embodiments provide a reducer of an electronic power steering apparatus capable of decreasing axial and radial shock to a power transfer member and transferring power from a first shaft to a second shaft without vibration or noise.

Also, the objectives of the exemplary embodiments are not limited thereto, and other objectives which are not mentioned herein can be apparently understood by those skilled in the art from the following description.

According to exemplary embodiments, there is provided a reducer of an electric power steering apparatus in which a first shaft and a second shaft are connected to each other to transfer driving force of a driving motor, the reducer including an inner rotor including an insertion hole formed axially with respect to the second shaft and a first protrusion formed radially with respect to the second shaft; an elastic body formed to surround an outer circumferential surface of the inner rotor, the elastic body including a second protrusion formed radially with respect to the second shaft and an elastic protrusion formed on the second protrusion axially with respect to the second shaft; and an outer rotor coupled to the inner rotor, the outer rotor including a third protrusion coupled to the first shaft and formed radially with respect to the second shaft.

Also, according to exemplary embodiments, there is a provided a reducer of an electric power steering apparatus, the reducer including a first shaft having at least one protrusion provided at an outer circumferential surface; a second shaft having at least one axial extension at one end; and a power transfer member having a first coupling part including an insertion hole, into which the protrusion is to be inserted so that the first shaft is coupled to the first coupling part, in a center area, and a second coupling part, on which the extension is to be mounted so that the second shaft is coupled to the second coupling part, on an outer circumferential surface.

According to the exemplary embodiments, the reducer of the electric power steering apparatus can reduce axial and radial shock to the power transfer member and transfer power from the first shaft to the second shaft without vibration and noise.

Other features and advantages may be made through the detailed description of exemplary embodiments.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, exemplary embodiments will be described in detail with reference to the accompanying drawings so that they can be easily practiced by those skilled in the art. The exemplary embodiments may, however, be embodied in many different forms and should not be construed as being limited to the embodiments set forth herein.

To clearly describe exemplary embodiments, descriptions of portions irrelevant to the essence of the embodiments may be omitted, and the same or similar elements are denoted by the same reference numerals throughout the specification.

Furthermore, when a part is referred as "including" elements, it should be understood that it can include only those elements, or other elements as well as those elements unless specifically described otherwise. The terminologies used hereafter are merely for describing a specific exemplary embodiment and are not intended to limit the present invention and have the same meanings as those that those skilled in the art generally understand unless otherwise defined herein.

Figure 1:
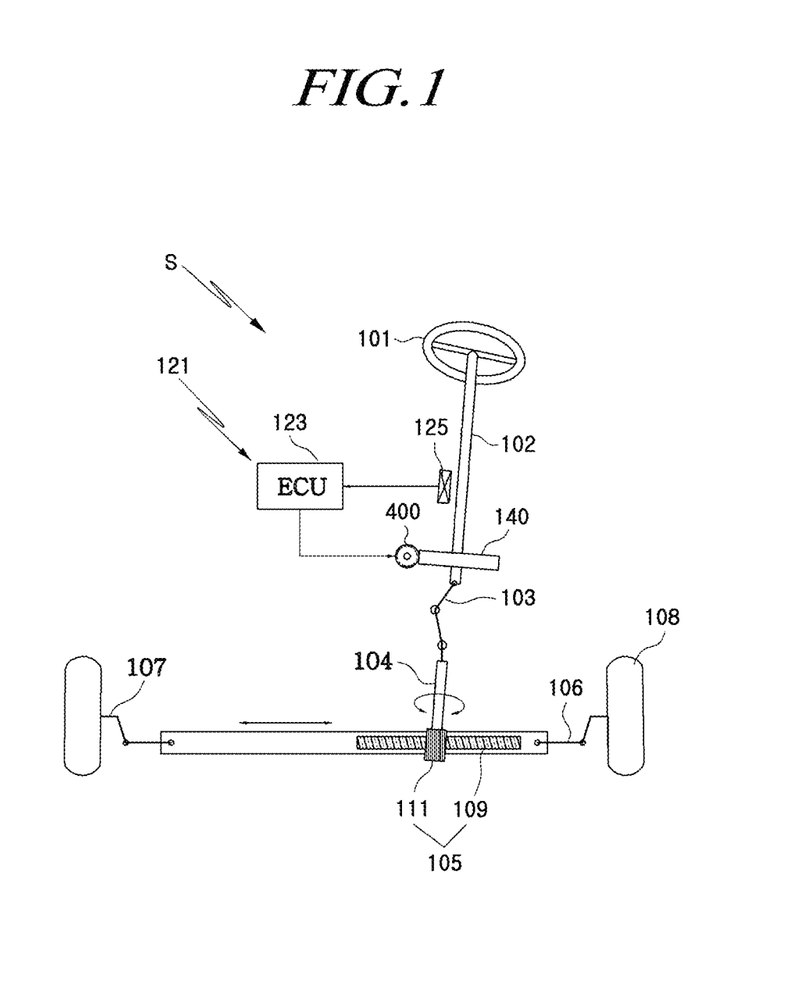
FIG. 1 is a schematic diagram illustrating a reducer of an electric power steering apparatus according to exemplary embodiments.
Figure 2:
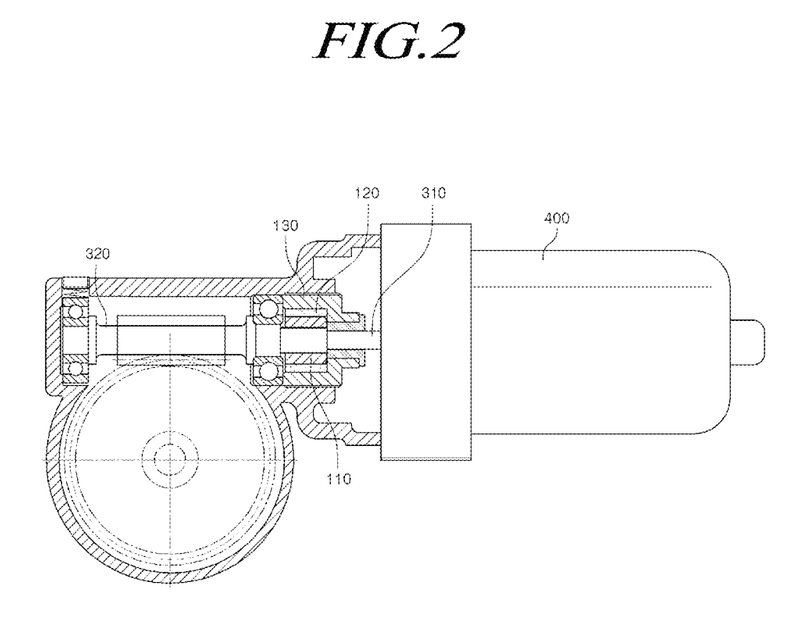
FIG. 2 is a sectional view showing the reducer of the electric power steering apparatus according to exemplary embodiments.
Figure 3:
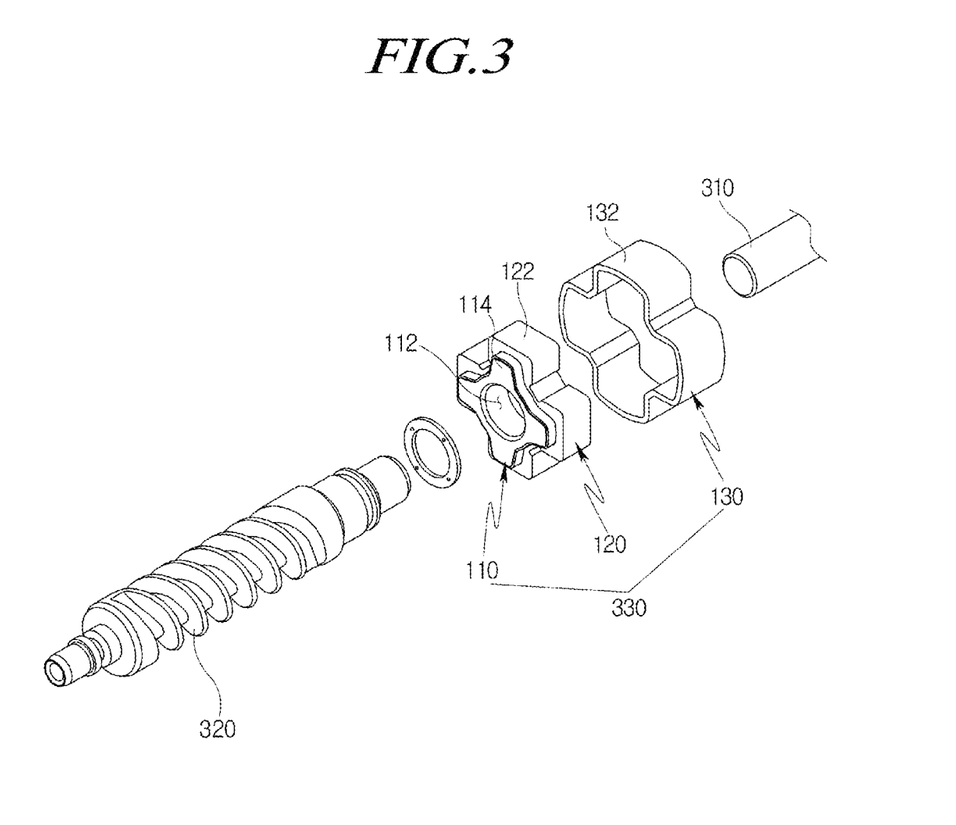
FIGS. 3 to 5 are perspective views showing the reducer of the electric power steering apparatus according to exemplary embodiments.
Figure 4:
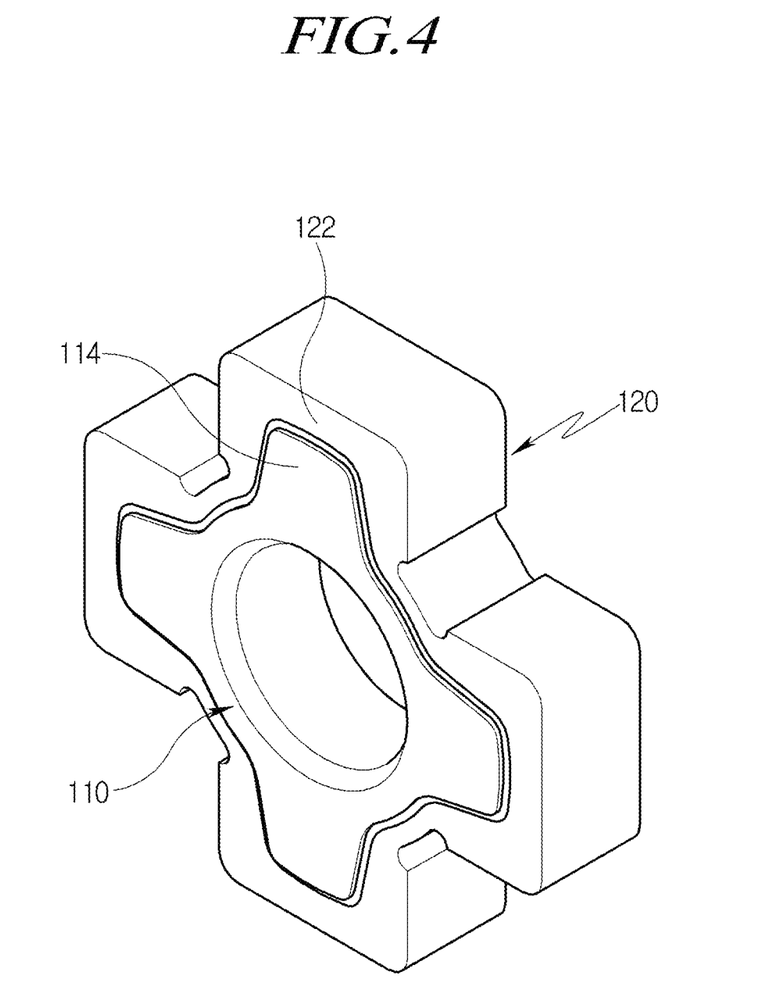
Figure 5:
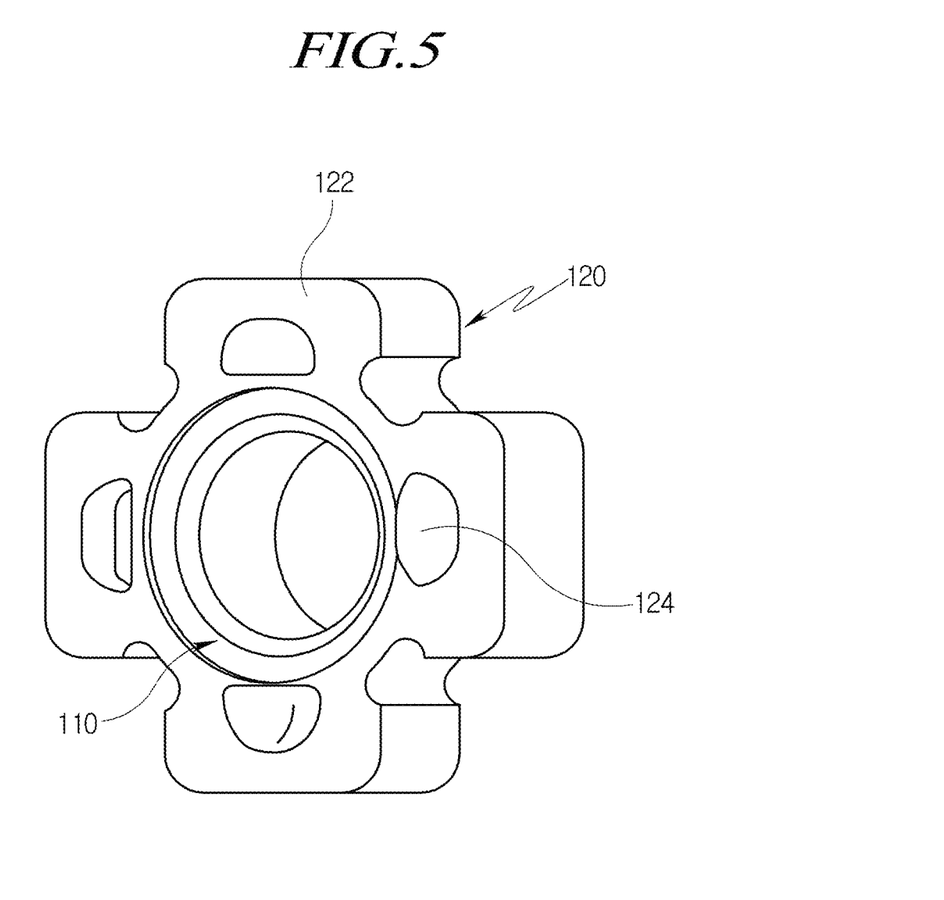
Figure 6:
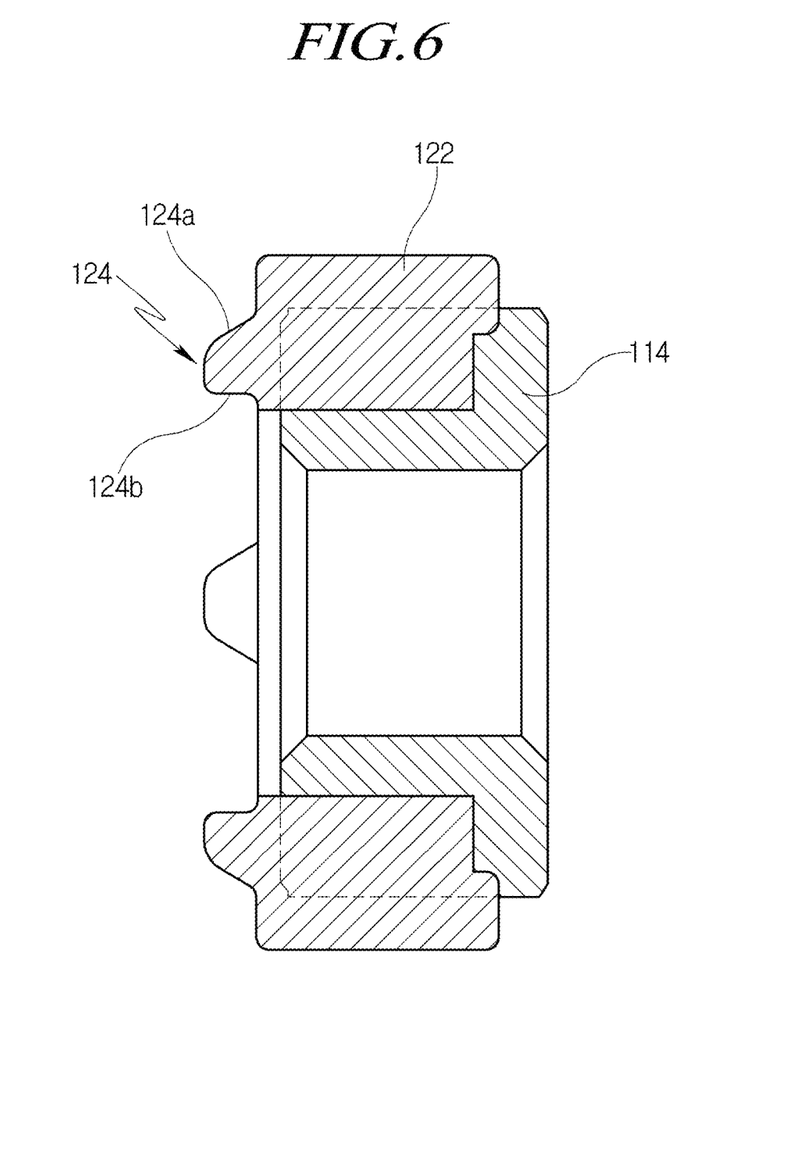
FIG. 6 is a sectional view showing the reducer of the electric power steering apparatus according to exemplary embodiments.
Figure 7:
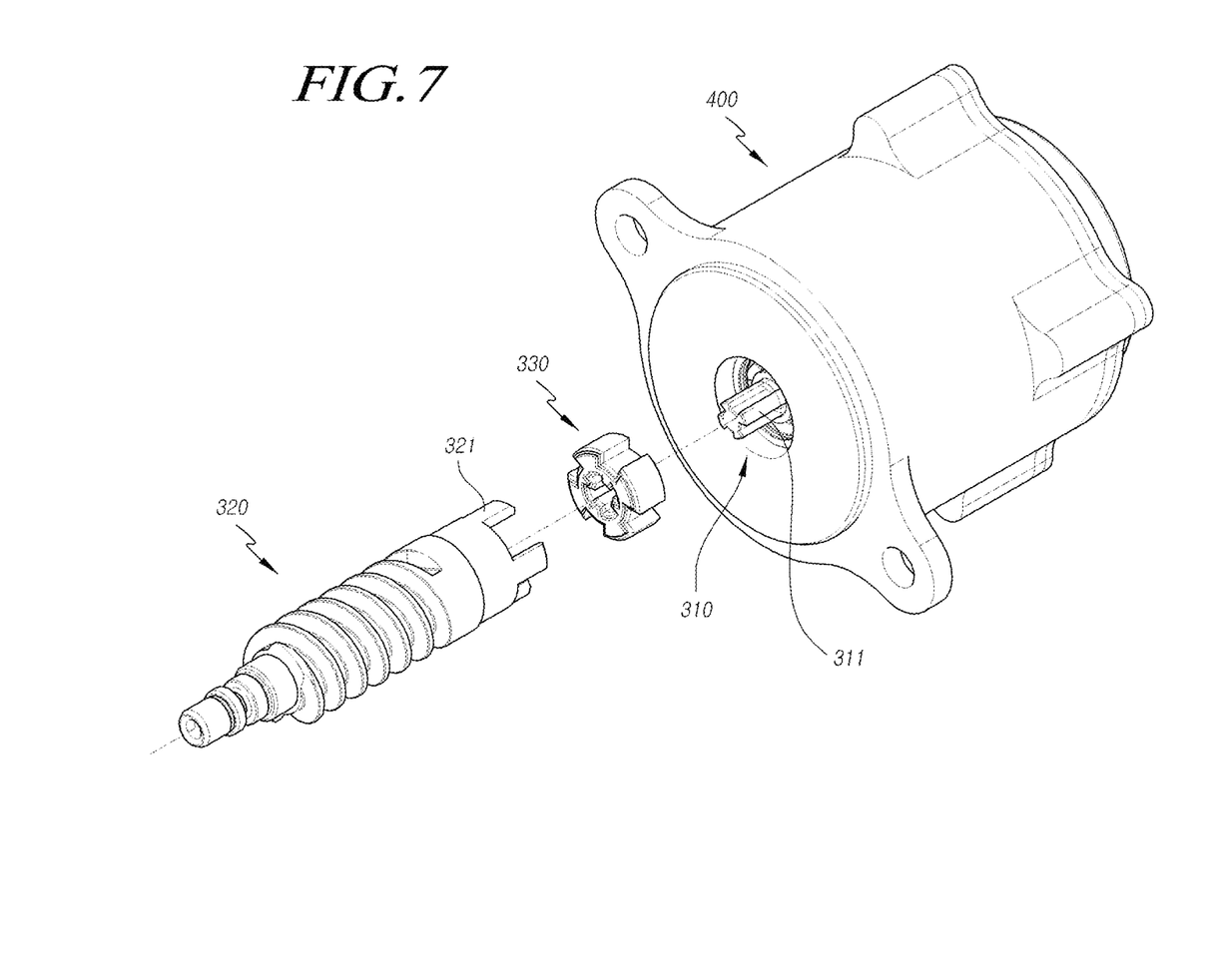
FIG. 7 is an exploded perspective view showing the reducer of the electric power steering apparatus according to exemplary embodiments.
Figure 8:
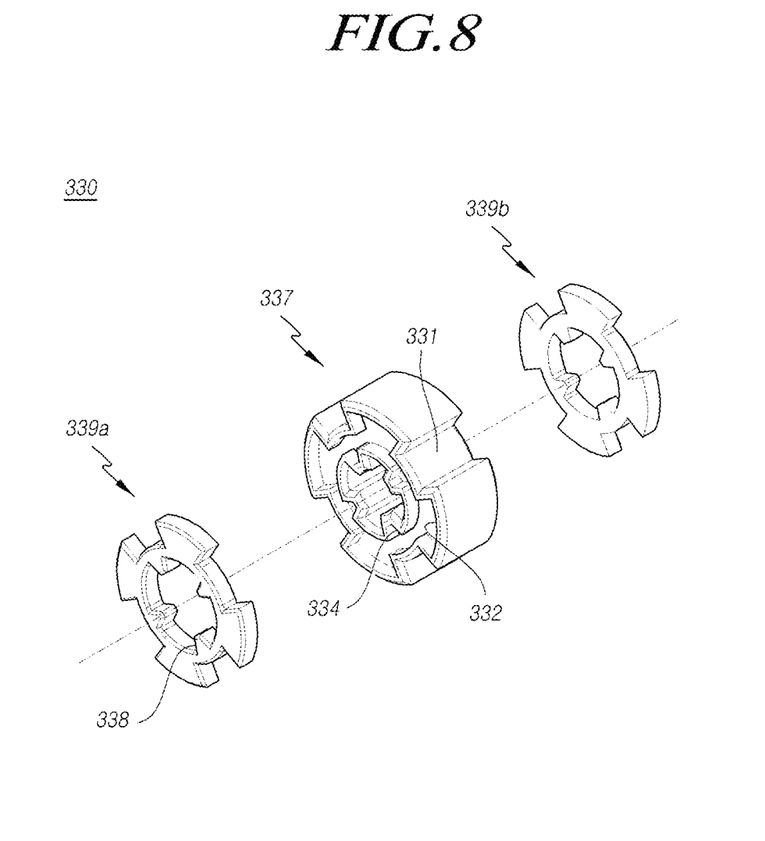
FIG. 8 is a perspective view showing the reducer of the electric power steering apparatus according to exemplary embodiments.
Figure 9:
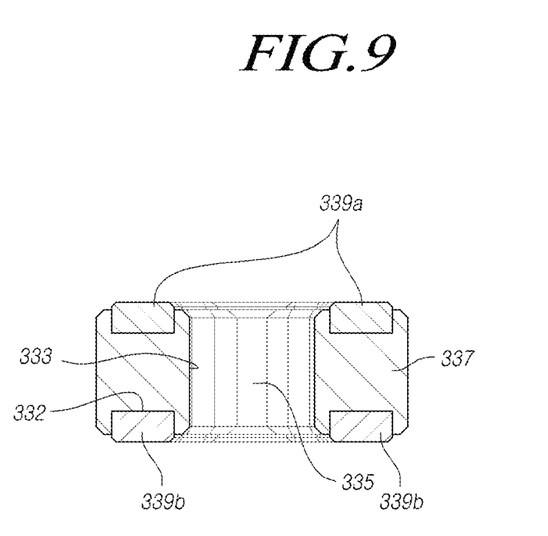
FIGS. 9 and 10 are sectional views showing the reducer of the electric power steering apparatus according to exemplary embodiments.
Figure 10:
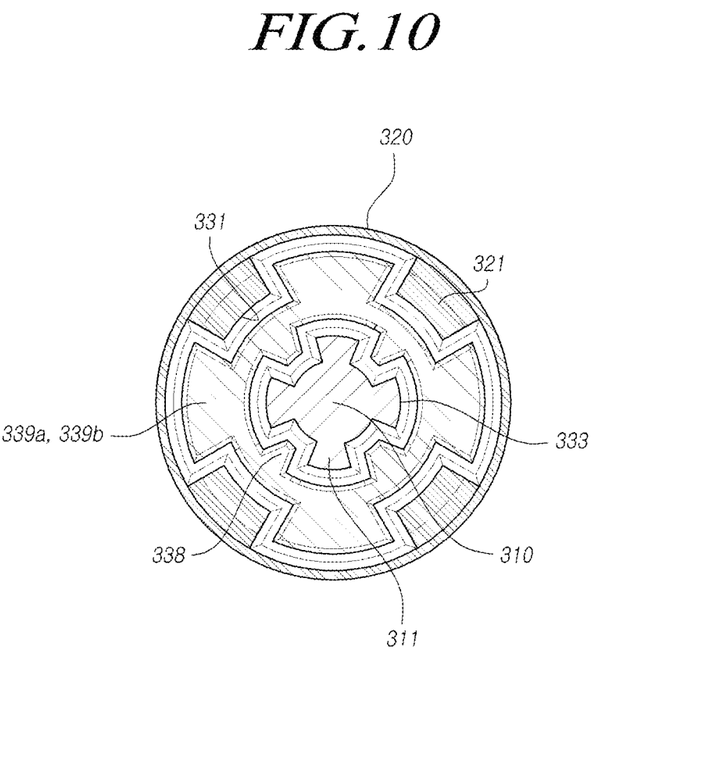

FIG. 1 is a schematic diagram illustrating a reducer of an electric power steering apparatus according to exemplary embodiments; FIG. 2 is a sectional view showing the reducer of the electric power steering apparatus according to exemplary embodiments; FIGS. 3 to 5 are perspective views showing the reducer of the electric power steering apparatus according to exemplary embodiments; FIG. 6 is a sectional view showing the reducer of the electric power steering apparatus according to exemplary embodiments; FIG. 7 is an exploded perspective view showing the reducer of the electric power steering apparatus according to exemplary embodiments; FIG. 8 is a perspective view showing the reducer of the electric power steering apparatus according to exemplary embodiments; and FIGS. 9 and 10 are sectional views showing the reducer of the electric power steering apparatus according to exemplary embodiments.

First, referring to FIG. 1, the electric power steering apparatus includes a steering system S ranging from a steering wheel 101 to both wheels 108 and an auxiliary power mechanism 121 that provides auxiliary steering power to the steering system S.

The steering system S has one side connected to the steering wheel 101 to rotate together with the steering wheel 101 and the other side including a steering shaft 102 connected to a pinion shaft 104 by means of a pair of universal joints 103. Also, the pinion shaft 104 is connected to a rack bar through a rack-pinion mechanism unit 105, and both ends of the rack bar are connected to the wheels 108 through a tie rod 106 and a knuckle arm 107.

The rack-pinion mechanism unit 105 is formed by engaging a pinion gear 111 formed on the pinion shaft 104 with a rack gear 109 formed on one side of an outer circumferential surface of the rack bar. Thus, when a driver operates the steering wheel 101, torque is generated in the steering system S, and the wheels 108 are steered by the torque through the rack-pinion mechanism unit 105 and the tie rod 106.

The auxiliary power mechanism 121 includes a torque sensor 125 configured to detect torque applied to the steering wheel 101 by the driver and output an electric signal proportional to the detected torque, an electronic control unit 123 configured to generate a control signal on the basis of an electric signal delivered from the torque sensor 125, a driving motor 400 configured to generate auxiliary power on the basis of a signal delivered from the electronic control unit 123, and a reducer 140 configured to deliver the auxiliary power generated by the driving motor 400 to the steering shaft 102.

The reducer of the electric power steering apparatus may be connected to a first shaft 310 and a second shaft 320 to deliver a driving force of the driving motor 400 and may be configured to include a power transfer member 330 for connecting the first shaft 310 and the second shaft 320.

Here, the power transfer member 330 is coaxially connected to the first shaft 310, which is connected to the driving motor 400, a power source such as a pump, or the like to be able to rotate, to deliver a driving force from the power source to the second shaft 320. In the detailed description of the exemplary embodiments, the first shaft 310 will be described using the reducer of the electric power steering apparatus composed of a motor shaft as an example, and the second shaft 320 will be described using the reducer of the electric power steering apparatus composed of a worm shaft as an example.

In this case, the power transfer member 330 may be used as a power connection apparatus for assisting the driver's steering force by connecting the worm shaft and the motor shaft that generate auxiliary power of the electric power steering apparatus and transferring the auxiliary power generated by the motor to a steering shaft coupled to a worm wheel.

The driving motor 400 has a first shaft 310 extending outward from a housing of the driving motor 400, and the outer rotor 130 has one side connected to the first shaft 310 to interoperate with the first shaft 310.

The inner rotor 110 is connected to the second shaft 320, and the inner rotor 110 has a structure in which one side of the inner rotor 110 is inserted into the outer rotor 130 connected to the first shaft 310.

Referring to FIG. 3, the power transfer member 330 includes the inner rotor 110, an elastic body 120, and the outer rotor 130.

The power transfer member 330 is a power connection apparatus for assisting the driver's steering force by connecting the first shaft 310 and the second shaft 320 of the motor that generate auxiliary power of the electric power steering apparatus and transferring the auxiliary power generated by the motor to the steering shaft coupled to the worm wheel.

The power transfer member 330 may include the inner rotor 110, which is connected to the second shaft 320; the outer rotor 130, which is connected to the first shaft 310 of the motor; and the elastic body 120, which is formed between the inner rotor 110 and the outer rotor 130.

The inner rotor 110 has an insertion hole 112 formed axially with respect to the second shaft 320 and includes a first protrusion 114 formed radially with respect to the second shaft 320. In detail, the insertion hole 112 into which the second shaft 320 is to be inserted axially with respect to the second shaft 320 is formed in the inner rotor 110.

Also, one or more first protrusions 114 are formed in the inner rotor 110 vertically to the second shaft 320. Here, four first protrusions 114 may be formed on upper, lower, left and right sides.

The elastic body 120 is formed to surround an outer circumferential surface of the inner rotor 110. The elastic body 120 includes a second protrusion 122 formed radially with respect to the second shaft 320, and includes an elastic protrusion 124 formed axially with respect to the second shaft 320.

In detail, the elastic body 120 is formed to surround the outer circumferential surface of the inner rotor 110. Here, the second protrusion 122 of the elastic body 120 may be formed to surround, and correspond to, the first protrusion 114 of the inner rotor 110.

Here, the elastic body 120 may be formed to surround the outer circumferential surface of the inner rotor 110. In detail, the elastic body 120 may be formed to surround a portion of an outer circumferential surface of the first protrusion 114.

Here, when the direction of the second shaft 320 is called the front surface of the first protrusion 114, the elastic body 120 may be formed to surround the entire outer circumferential surface except the front surface of the first protrusion 114. In this case, the inner rotor 110 may be formed to protrude outward from the elastic body 120. Here, the elastic protrusion 124 may be formed on the second protrusion 122 to surround the rear surface of the first protrusion 114.

Here, the elastic protrusion 124 is formed on the second protrusion 122, and the elastic protrusion 124 has a first surface 124a formed vertically to the second protrusion 122 and a second surface 124b formed in a curved shape and connected to one end of the first surface 124a and a portion of the second protrusion 122. That is, the elastic protrusion 124 may be formed on the second protrusion 122 in a quarter spherical shape.

Here, the first surface 124a of the elastic protrusion 124 has a smaller gradient than the second surface 124b of the elastic protrusion 124, and therefore a load applying direction may be induced inwards during preloading.

Also, the elastic protrusion 124 may be formed axially with respect to the first shaft 310 and the second shaft 320, that is, vertically to the second protrusion 122. The elastic protrusion 124 may be formed toward the first shaft 310.

Here, an adhesive may be applied to the outer circumferential surface of the first protrusion 114 on which the elastic body 120 is brought into contact with the inner rotor 110. In this case, an adhesive may be applied to the outer circumferential surface of the first protrusion 114 with which the elastic body 120 is brought into contact with the inner rotor 110 axially with respect to the second shaft 320. Thus, the elastic body 120 and the inner rotor 110 may be integrally formed.

The outer rotor 130 includes a third protrusion 132 formed radially with respect to the second shaft 320 and is coupled to the inner rotor 110. In detail, through the applied adhesive, the outer rotor 130 is coupled to the inner rotor 110 and the elastic body 120 that are integrally formed.

Here, the third protrusion 132 corresponding to the first protrusion 114 formed on the inner rotor 110 and the second protrusion 122 formed on the elastic body 120 may be formed on the outer rotor 130. Also, the outer rotor 130 may be coupled to the first shaft 310.

The elastic body 120 is formed to surround the inner rotor 110. Here, the elastic body 120 is formed to surround the first protrusion 114 formed on the inner rotor 110.

In this case, the elastic body 120 may be formed to surround a portion of the outer circumferential surface of the first protrusion 114. That is, the elastic body 120 may be formed not to surround the front surface of the inner rotor 110.

The elastic body 120 is formed to surround the inner rotor 110. Here, the elastic body 120 is formed to surround the first protrusion 114 formed on the inner rotor 110.

In this case, the second protrusion 122 corresponding to the first protrusion 114 may be formed on the elastic body 120 and may be formed to surround a portion of the outer circumferential surface of the first protrusion 114. Here, the elastic protrusion 124 may be formed on the rear surface of the second protrusion 122.

The elastic protrusion 124 has a first surface 124a formed vertically to the second protrusion 122 and a second surface 124b formed in a curved shape and connected to one end of the first surface 124a and a portion of the second protrusion 122.

That is, the elastic protrusion 124 may be formed on the second protrusion 122 in a quarter spherical shape and may be formed for each second protrusion 122. In this case, the rear surface of the first protrusion 114 may be surrounded by the elastic protrusion 124 formed on the second protrusion 122.

Also, the elastic body 120 is formed to surround the inner rotor 110. Here, the elastic body 120 is formed to surround the first protrusion 114 formed on the inner rotor 110.

In detail, the elastic body 120 may be formed to surround a portion of the inner rotor 110. Here, the elastic body 120 is formed to surround the first protrusion 114 formed on the inner rotor 110. In this case, the second protrusion 122 corresponding to the first protrusion 114 may be formed on the elastic body 120 and may be formed to surround a portion of the outer circumferential surface of the first protrusion 114. In this case, the inner rotor 110 may be formed to protrude outward from the elastic body 120.

Also, the elastic protrusion 124 may be formed on the rear surface of the second protrusion 122 of the elastic body 120. The elastic protrusion 124 has a first surface 124a formed vertically to the second protrusion 122 and a second surface 124b formed in a curved shape and connected to one end of the first surface 124a and a portion of the second protrusion 122.

That is, the elastic protrusion 124 may be formed on the second protrusion 122 in a quarter spherical shape. In this case, the rear surface of the first protrusion 114 may be surrounded by the elastic protrusion 124 formed on the second protrusion 122.

Referring to FIGS. 7 to 10, the reducer of the electric power steering apparatus according to exemplary embodiments includes a first shaft 310 having at least one protrusion 311 provided on an outer circumferential surface, a second shaft 320 having at least one axial extension 321 provided at one end, and a power transfer member 330 having a first coupling part 335 including an insertion hole 333, into which the protrusion 311 is to be inserted so that the first shaft is coupled to the first coupling part 335, in a center area, and also a second coupling part 331, on which the extension 321 is to be mounted so that the second shaft 320 is coupled to the second coupling part 331, on an outer conferential surface.

The power transfer member 330 may coaxially connect the first shaft 310 and the second shaft 320. In order to transfer power, the first shaft 310 and the second shaft 320 are dually coupled to the center area and the outer circumferential surface of the power transfer member 330, respectively.

The first shaft 310 has at least one protrusion 311 provided on an outer circumferential surface, and the second shaft 320 has at least one axial extension 321 provided at one end. Thus, the first shaft 310 and the second shaft 320 may be coupled to the power transfer member 330.

The power transfer member 330 has a first coupling part 335, through which the first shaft 310 is to be coupled, provided in the center area. An insertion hole 333, into which the protrusion 311 of the first shaft 310 is to be inserted, is provided on an inner circumferential surface of the first coupling part 335.

Also, a second coupling part 331 on which the extension 321 of the second shaft is to be mounted is formed on the outer circumferential surface of the power transfer member 330, and the second shaft 320 is coupled to the outer circumferential surface of the power transfer member 330.

Therefore, it is possible to reduce volume significantly, decrease the number of components, and shorten a production process compared to the conventional structure of the power transfer member in which the inner rotor and the outer rotor are press-fitted.

Also, when two or more protrusions 311 are provided, the protrusions 311 are equally spaced apart from one other circumferentially with respect to the first shaft 310. Thus, uniform rotation, without bias, is possible during power transfer.

Also, the extension 321 of the second shaft 320 may include the same number of extensions 321 as the number of protrusions 311 of the first shaft 310. Here, the extensions 321 may be circumferentially arranged corresponding to the protrusions 311.

Also, the extensions 321 of the second shaft 320 may be equally spaced apart from one another circumferentially according to the space between the protrusions 311. Accordingly, rotational load is uniformly applied during power transfer, and thus it is possible to minimize vibration.

The power transfer member 330 may include a damping member 337 formed in a center area and supporting members 339a and 339b provided at both ends of the damping member 337.

The damping member 337 has a first coupling part 335 and a second coupling part 331 provided in a center area and on an outer circumferential surface, respectively, and also is formed of an elastic material. Accordingly, it is possible to absorb noise and vibration applied to the first shaft 310 and the second shaft 320 during power transfer.

Here, the damping member 337 may be formed of a material such as natural rubber (NR), nitrile butadiene rubber (NBR), chloroprene rubber (CR), ethylene propylene terpolymer (EPDM), fluoro rubber (FPM), styrene butadiene rubber (SBR), chlorosulphonated polyethylene (CSM), urethane, silicone, etc. to provide durability and extensibility, in addition to elasticity, and acts as damping for absorbing noise and vibration.

The supporting members 339a and 339b provided at both axial ends of the damping member 337 are formed of a plastic resin or a metal material having a greater strength than that of the damping member 337 to transfer rotational torque during power transfer of the first shaft 310 and the second shaft 320.

The supporting members 339a and 339b are formed integrally with the damping member 337. Alternatively, when coupling holes 332 are formed on both surfaces of the damping member 337, the supporting members 339a and 339b may be press-fitted into the coupling holes 332 of the damping member 337. In some cases, the supporting members 339a and 339b may be bonded or vulcanized to the damping member 337.

Also, supporting protrusions 338 that protrude radially and inwardly are provided on inner circumferential surfaces of the supporting members 339a and 339b, and the supporting protrusions 338 are circumferentially arranged corresponding to the insertion hole 333. Thus, it is possible to prevent idling or separation when the first shaft 310 rotates.

That is, on the outer circumferential surface of the power transfer member 330, the extensions 321 of the second shaft 320 are coupled to second coupling parts 331 recessed from the outer circumferential surface of the damping member 337, and thus it is possible to prevent idling or separation during rotation.

Also, in the center area of the power transfer member 330, the protrusions 311 are coupled to the insertion hole 333, and the supporting protrusions 338 arranged corresponding to the insertion hole 333 are coupled to supporting holes 334. Thus, it is possible to prevent the first shaft 310 from idling or being separated even when high rotational force is transferred from the driving motor 400.

Accordingly, torque may be reliably transferred even in an electric power steering apparatus in which the forward rotation and reverse rotation of the driving motor 400 are repeated, and the first shaft 310 and the second shaft 320 may be kept in contact with only the damping member 337, thus efficiently absorbing noise and vibration.

Here, when no external force is applied, the amount by which the damping member 337 is pressed may approximately range from 10% to 15% and may be changed depending on the magnitude of the transferred driving force.

Also, when assembled, the damping member 337 is elastically deformed by the protrusions 311 and the extensions 321, and thus the pressing and coupling are made.

In the above description of these embodiments, the first shaft 310 is coupled to the center area of the power transfer member 330, and the second shaft 320 is coupled to the outer circumferential surface of the power transfer member 330. However, this is merely an example, and the present invention is not limited thereto. It should be noted that an extension 321 to which the first shaft 310 is to be coupled is provided on the outer circumferential surface of the power transfer member 330 and the protrusion 311 is coupled to the outer circumferential surface of the second shaft 320.

According to exemplary embodiments having such a structure and such a form, it is possible to reduce volume significantly, decrease the number of components, and shorten a production process compared to the conventional structure of the power transfer member in which the inner rotor and the outer rotor are press-fitted.

Also, according to exemplary embodiments, it is possible to remove noise due to a clearance between a shaft and a power transfer member and prevent vibration and noise during power transfer at a portion in which two shafts are coupled to each other.

It will be understood by those skilled in the art that various changes in form and details may be made therein without departing from the spirit and scope of the invention and thus the embodiments described herein are to be considered in all respects illustrative and not restrictive. Therefore, the scope of the present invention is defined not by the detailed description but by the following claims, and all changes or modifications within the claims and their equivalents will be construed as being included in the scope of the present invention.

What is claimed is:

1. A reducer of an electric power steering apparatus in which a first shaft and a second shaft are connected to each other to transfer driving force of a driving motor, the reducer comprising:
   an inner rotor including an insertion hole formed axially with respect to the second shaft and a first protrusion formed radially with respect to the second shaft;
   an elastic body formed to surround an outer circumferential surface of the inner rotor, the elastic body including a second protrusion formed radially with respect to the second shaft and an elastic protrusion formed on the second protrusion axially with respect to the second shaft, wherein one surface of the elastic body formed opposite to another surface of the elastic body, from which the elastic protrusion formed on the second protrusion protrudes, is supported by at least a part of the first protrusion of the inner rotor; and
   an outer rotor coupled to the inner rotor, the outer rotor including a third protrusion coupled to the first shaft and formed radially with respect to the second shaft.

2. The reducer of claim 1, wherein the elastic body is formed to surround an outer circumferential surface of the first protrusion, and the inner rotor protrudes outward from the elastic body.

3. The reducer of claim 1, wherein the elastic protrusion is formed on the second protrusion toward the first shaft.

4. The reducer of claim 1, wherein the elastic protrusion includes a first surface formed vertically to the second protrusion and a second surface connected to one end of the first surface and a portion of the second protrusion and formed in a curved shape.

5. The reducer of claim 4, wherein the first surface of the elastic protrusion has a smaller gradient than the second surface of the elastic protrusion.

6. The reducer of claim 1, wherein in the inner rotor, an adhesive is applied to an upper surface of the first protrusion that is in contact with the elastic body.

7. A reducer of an electric power steering apparatus, the reducer comprising:
- a first shaft having at least one protrusion provided at an outer circumferential surface;
- a second shaft having at least one axial extension at one end; and
- a power transfer member having a first coupling part including an insertion hole, into which the at least one protrusion is to be inserted so that the first shaft is coupled to the first coupling part which is in a center area of the power transfer member, and a second coupling part, wherein the at least one axial extension of the second shaft is mounted on an outer circumferential surface of the second coupling part of the power transfer member so that the second shaft is coupled to the outer circumferential surface of the second coupling part.

8. The reducer of claim 7, wherein when the at least one protrusion includes two or more protrusions which are spaced apart from one another circumferentially with respect to the first shaft.

9. The reducer of claim 8, wherein when the at least one axial extension includes two or more extensions which are circumferentially arranged corresponding to the two or more protrusions.

10. The reducer of claim 8, wherein the two or more protrusions are equally spaced apart from one another circumferentially with respect to the first shaft, and the two or more extensions are equally spaced apart from one another circumferentially according to the space between the two or more protrusions.

11. The reducer of claim 8, wherein the power transfer member comprises:
- a damping member formed of an elastic material, the damping member having the first coupling part and the second coupling part in a center area and on an outer circumferential surface, respectively; and
- supporting members provided at both axial ends of the damping member and formed of a material having greater strength than the damping member.

12. The reducer of claim 11, wherein the supporting members are formed integrally with the damping member or are pressed-fitted to coupling holes formed on both side surfaces of the damping member.

13. The reducer of claim 12, wherein the supporting members have supporting protrusions protruding radially and inwardly on an inner circumferential surface.

14. The reducer of claim 13, wherein the supporting protrusions are circumferentially arranged corresponding to the insertion hole.

15. The reducer of claim 1, wherein the elastic protrusion formed on the second protrusion axially protrudes toward the first shaft from the another surface of the elastic body formed opposite to the one surface of the elastic body supported by the at least a part of the first protrusion of the inner rotor.

16. The reducer of claim 7, wherein the at least one axial extension of the second shaft surrounds at least a part of the outer circumferential surface of the second coupling part of the power transfer member.

* * * * *